July 11, 1967   T. L. DAVIDSON ETAL   3,330,465
DISPLAY AND PACKAGING TRAY AND BLANK FOR PRODUCING THE SAME
Filed July 20, 1965   6 Sheets-Sheet 1

INVENTORS
THOMAS L. DAVIDSON
KENNETH D. BIXLER
BY KARL W. FLOCKS
ATTORNEY

July 11, 1967  T. L. DAVIDSON ET AL  3,330,465
DISPLAY AND PACKAGING TRAY AND BLANK FOR PRODUCING THE SAME
Filed July 20, 1965  6 Sheets-Sheet 2

INVENTORS,
THOMAS L. DAVIDSON
KENNETH D. BIXLER

BY KARL W. FLOCKS
ATTORNEY

United States Patent Office 3,330,465
Patented July 11, 1967

3,330,465
DISPLAY AND PACKAGING TRAY AND BLANK
FOR PRODUCING THE SAME
Thomas L. Davidson, Springfield, Mass., and Kenneth D. Bixler, Huntington, N.Y., assignors to Diamond International Corporation, New York, N.Y., a corporation of Delaware
Filed July 20, 1965, Ser. No. 473,304
19 Claims. (Cl. 229—34)

ABSTRACT OF THE DISCLOSURE

A one-piece blank and display tray produced from the same, in which outer walls of the carton are automatically oriented normal to a bottom wall after the blank has been glued and assembled in a folded-flat condition, and in which the tray includes inwardly angled walls retained in a position by improved lock-up means and an article will be retained, cushioned and framed by the angular inner walls of the display tray.

This invention relates generally to folding boxes and more particularly to improvements in a display and packaging tray particularly adapted for supporting an article in a cradled and protected position while displaying the merchandise in an attractive and eye-catching position.

Primary objects of the present invention are to provide a novel blank and packaging and display which are produced from a single sheet of suitably cut and scored paperboard material, to provide a blank and tray which blank may be preassembled to provide a folded tray including self-orienting outer walls, which may be readily and quickly assembled manually or which is adaptable for use on automatic set-up machinery, a tray which is exceptionally strong and reinforced at its corners to provide exceptional stacking strength and which has novel means for orienting inwardly converging inner wall panels of the tray, and which includes an expansible feature comprising a displaceable sling or support portion for the article packaged and displayed in the tray.

Other objects and the specific nature and character of the invention will become apparent from a consideration of the following description when taken in conjunction with the accompanying drawings forming a part therein, in which.

Figure 1:
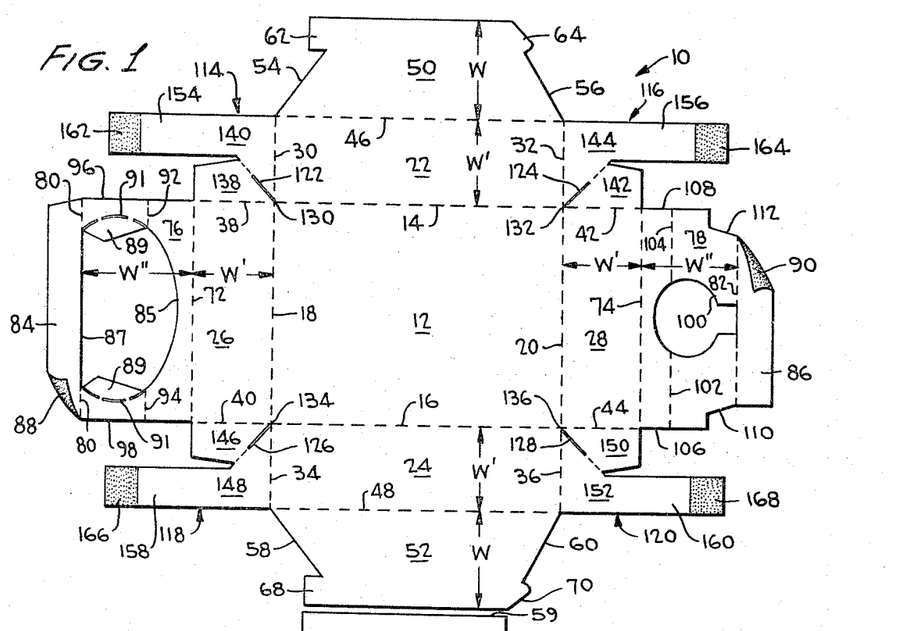
FIG. 1 is a plan view of a blank from which a tray embodying the invention may be produced.

Referring to the drawings in detail, and first considering FIG. 1, a suitably cut-and-scored one-pieced paperboard blank is indicated generally at 10 and includes a rectangular bottom panel 12 having foldably connected to opposed pairs of side margins 14, 16 and 18, 20 pairs of rectangular, outer side wall panels 22, 24 and 26, 28 respectively.

The outer wall panels 22 and 24 respectively include end-marginal fold lines 30, 32 and 34, 36 which comprise colinear extensions of marginal fold lines 18 and 20 of the bottom panel 12. The other pair of outer side wall panels 26 and 28 include end-marginal fold lines 38, 40 and 42, 44, respectively which constitute colinear projections of the marginal fold lines 14 and 16 of the bottom panel 12.

The outer wall panels 22 and 24 include upper marginal fold lines 46 and 48 respectively parallel to the fold lines 14 and 16. Foldably connected to fold lines 46 and 48 are inner wall panels 50 and 52 which have a width W greater than the corresponding width W' of the outer wall panels 22 and 24 to which they are foldably connected. This dimensional relationship, as will subsequently be described in detail, provides inward convergence of the inner wall panels when the display tray is erected. The inner wall panels 50 and 52 include converging free side margins 54, 56 and 58, 60, terminating in laterally projecting lock tabs 62, 64 and 68, 70, respectively.

The outer wall panels 26 and 28 include upper or outer marginal fold lines 72 and 74, to which are foldably connected a second pair of inner wall panels 76 and 78, respectively, it being noted that the marginal fold lines 72 and 74 are respectively parallel to the marginal fold lines 18 and 20 of the bottom wall 12. The second pair of inner wall panels 76 and 78 include a transverse marginal fold or score line 80 and 82 parallel to the respective fold lines 72 and 74 and to which are hingedly connected transverse anchor flaps 84 and 86.

The anchor flaps 84 and 86 include, on the side opposite that shown in FIG. 1, glue receiving portions 88 and 90, respectively, utilized in the final erection of the blank to form the display tray. The width W'' of the inner wall panels 76 and 78 is greater than the corresponding dimension or width W' of the outer wall panels 26 and 28 to provide the inward convergence of the inner wall panels 76 and 78 in the assembled and finally erected tray. The marginal fold line 80 comprises colinear segments as indicated in FIG. 1 and includes a cut-out portion 85 for receiving a correspondingly shaped portion of an article such as a bottle or the like therein; a linear portion 87 of the cutout 85 coinciding with the segmental fold line margin 80. If desired, the cutout 85 may include tab elements 89 engageable with the article being supported and articulated to a portion comprising a continuation of the cutout 85 by means of score lines 91. Extending transversely through an intermediate portion of the inner wall panel 76 are colinear segmental fold lines 92 and 94 which extend from the cutout 85 to the free side margins 96 and 98 at opposite sides of the inner wall panel 76.

The inner wall panel 78 includes an intermediate cutout portion 100 extending to the segmental fold line 82 and has extending transversely thereacross colinear, segmental score or fold lines 102 and 104 which extend from opposite sides of the cutout 100 to the free side margins 106 and 108 of the panel 78. The inner side wall panel 78 has extending inwardly from the free side margins 106 and 108 cutout or notch portions 110 and 112, respectively, to provide lock portions cooperating with the lateral tabs 70 and 64 of the respective inner wall panels 52 and 50 as will subsequently become apparent in the description of the erected tray.

Foldably connected between adjacent ends of the outer wall panels 22–28, i.e. at fold lines 30, 38; 32, 42; 34, 40; and 36, 44 are bellows-fold assemblies indicated generally at 114, 116, 118 and 120, respectively. The bellows-fold assemblies include angular fold or score lines 122, 124, 126, and 128, which extend from the corners 130, 132, 134 and 136, respectively, of the bottom panel 12 and define in the respective bellow-fold assembly substantially triangular segments 138, 140; 142, 144; 146, 148 and 150, 152. The segments 140, 144, 148 and 152 each include laterally projecting glue flaps 154, 156, 158 and 160, having inner margins extending from the terminal ends of the respective fold lines 122, 124, 126 and 128. A suitable adhesive indicated at 162–168 will be applied adjacent the terminal ends of the glue flaps 154–160, respectively, to facilitate the pre-assemblying of the blank.

The bellows-fold assemblies 114–120 will serve to orient outer wall panels 26 and 28 (and the portions attached thereto) in vertically extending and substantially mutually parallel relationship. These assemblies also provide a reinforcement to the corners of the erected tray as well as provide a cushioning effect to walls 22–28 and 50, 52, 76 and 78.

With respect to the cutouts 85 and 100, these cutouts may take any suitable configuration to provide end-receiving apertures at opposite ends of the articles to be packaged in the display tray of the invention.

Figure 2:
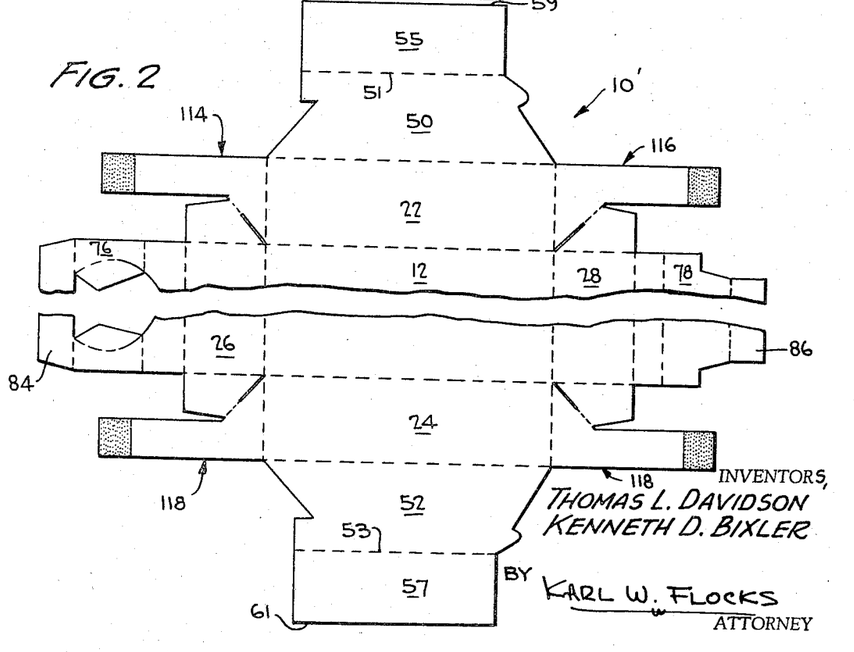
FIG. 2 is a plan view, similar to FIG. 1, showing a modified embodiment of the blank from which a tray embodying the invention may be produced.

Referring to FIG. 2, another embodiment of a blank 10' is disclosed which includes all of the structure described in detail with respect to the embodiment of FIG. 1. To facilitate the identification of similar structure and function of the corresponding portions of the blanks of FIGS. 1 and 2, reference numerals utilized to identify portions of FIG. 2 corresponding to those of FIG. 1 are identified by similar reference numerals.

The embodiment of FIG. 2 includes at the transverse marginal score or fold lines 51 and 53 of the inner wall panels 50 and 52 an abutment or cushioning panel 55 and 57, respectively, which includes free transverse abutment margins 59 and 61, respectively.

The function of the just described structure will be explained in detail with respect to FIG. 7, for example.

Figure 3:
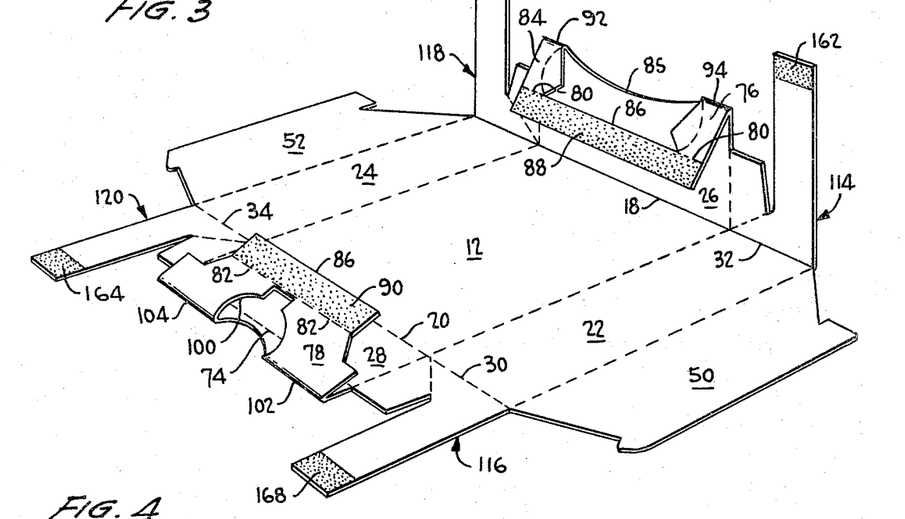
FIG. 3 is a perspective view of the blank of FIG. 1, showing an intermediate step of preassembly of the blank.
Figure 4:
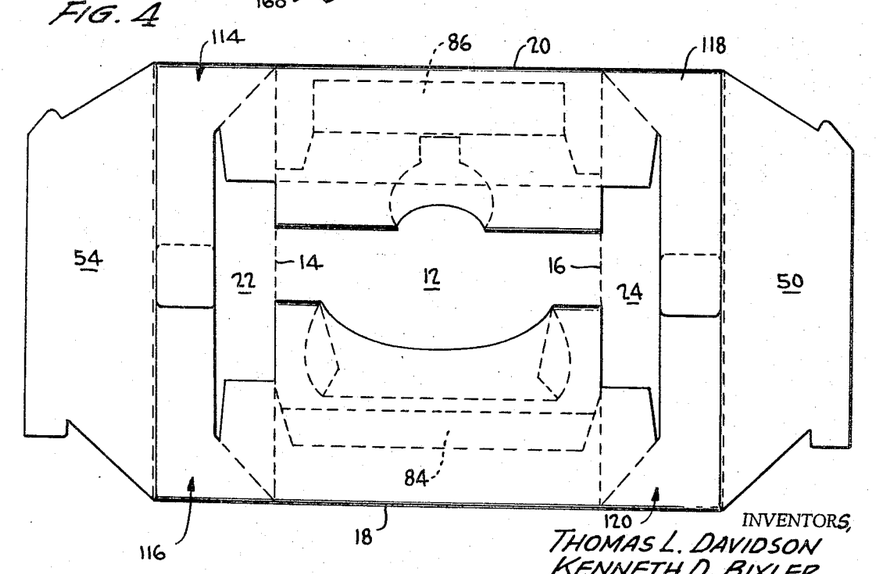
FIG. 4 is a plan view of the blank of FIG. 1 showing its pre-assembled condition prior to erection of the tray in its final form.

Referring to FIGS. 1 and 3–6, in FIGS. 3 and 4 pre-assembly of the blank 10 is illustrated. The inner wall panels 76 and 78 are initially folded into overlying relationship with respect to outer wall panels 26 and 28, respectively at the intermediate transverse fold lines 92, 94 and 102, 104. After this has been accomplished, as seen in the left hand portion of FIG. 3, the now folded outer and inner wall panels 28, 78, together with the bellows-flap assemblies 114 and 118, will be simultaneously folded on fold lines 20, 30 and 34 so that the adhesive portions 90, 164 and 168 adhere to the underlying portions of the bottom wall 12 and outer walls 22 and 24, respectively.

Likewise, the adhesive portion 88 of the overlying outer and inner walls 26 and 76, and adhesive portions 162, 166 of the respective bellows-fold assemblies 114 and 118 will adhere to the bottom wall 12, inner wall 22 and 24.

When this is accomplished, the blank of FIG. 1 will be pre-assembled as seen in FIG. 4. When the blank is pre-assembled in the manner seen in FIG. 4, it may be manually erected from this condition or may be erected by means of automatic set-up apparatus. It will be noted from FIG. 4 that the anchor flaps 84 and 86 will adhere to the bottom wall 12 in spaced relationship from the peripheral bordering hinge lines 18 and 20, respectively, and when the tray is in its final erected position, this orientation will result in inner walls 76 and 78 converging inwardly toward the inner surface of the bottom wall 12 (see FIG. 5).

Figure 5:
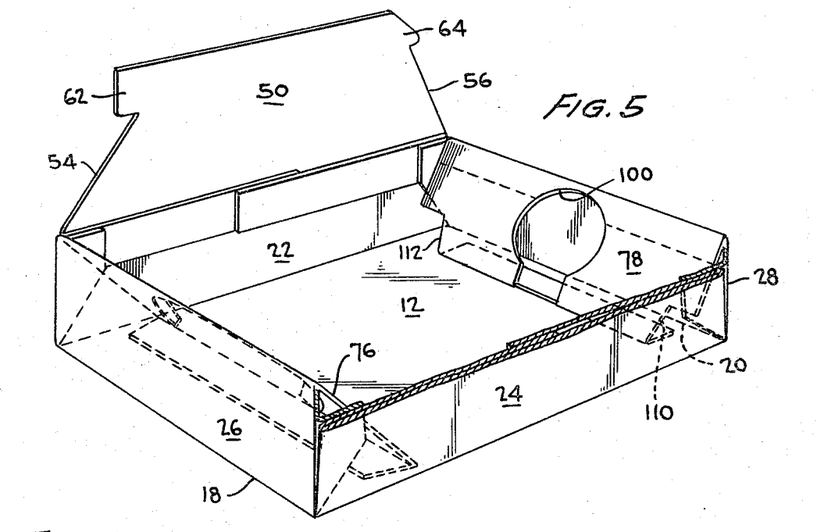
FIG. 5 is a fragmentary perspective view, with a portion broken away, and showing the tray in its partially erected condition.

The walls 26, 76 and 28, 78 are simultaneously oriented into their erected condition by inwardly folding outer walls 22 and 24 which results in the triangular segments of the bellows-fold assemblies 114–120 being disposed in juxtaposed relation as clearly seen in FIG. 5. The bellows-fold assemblies not only have the function of automatically orienting walls 26, 76 and 28, 78, but also provide a cushioning resiliency for the articles packaged and displayed in the erected tray. Accordingly, the bellows-fold assemblies have a dual function in the tray of this invention.

Figure 6:
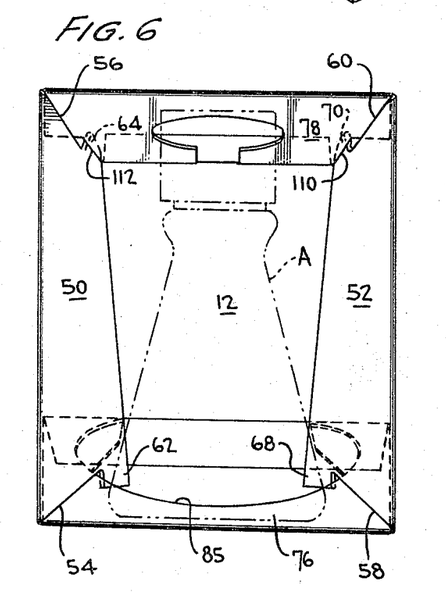
FIG. 6 is a plan view of the erected tray showing by means of phantom lines the relative position of the article to be packaged and displayed in the tray.

Final lock up of the tray is accomplished by pivoting the inner walls 50 and 52 about the hinge lines 46 and 48, respectively, and the lock lugs 64, 70 will be received behind the notch portions 112 and 110 formed on the inner wall panels 78 (see FIGS. 5 and 6). The angular margins 56 and 60 of the respective inner wall panels 50 and 52 will engage the outer wall surface of the inner wall 78 which extends angularly into the tray.

The lock lugs 62 and 68 at the other end of the inner wall panels 50 and 52, respectively, will be received within the aperture 85 in the other inner wall panel 76 with the angular margins 54 and 58 respectively engaging the angularly disposed inner wall panel 76.

The tray as seen in FIG. 6, is now ready to receive the article A, the cap portion thereof being received in aperture 100 and the bottom portion extending into the aperture 85. The bottom of the article or bottle will engage the lug elements 62 and 68 extending into the aperture 85 and the bottle is then in a sense cushioned by these lug elements in the aperture 85.

Figure 7:
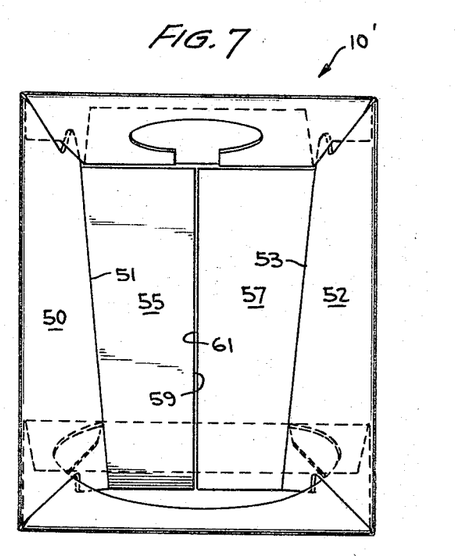
FIG. 7 is a plan view, similar to FIG. 6, and showing an erected packaging tray formed from the blank of FIG. 2.

Referring to FIG. 7, this is the embodiment of the tray which is produced from the blank of FIG. 2. Pre-assembly and erection is accomplished in the same manner as described in detail with respect to FIGS. 3–6. Additionally, corresponding functions are provided by corresponding structure of the embodiment of FIGS. 2 and 7.

In the embodiment of FIG. 7, the abutment panels 55 and 57 will be disposed in substantially overlying relationship with respect to the bottom panel 12 with their free edges 59 and 61, respectively, in substantially abutting engagement, as clearly apparent in FIG. 7. The abutment panels 55 and 57 aid in maintaining the angular relationship of the inwardly converging air panels 50 and 52 and additionally provide two layers of board material beneath the article packaged and displayed in the tray of FIG. 7.

Figures 8, 9:
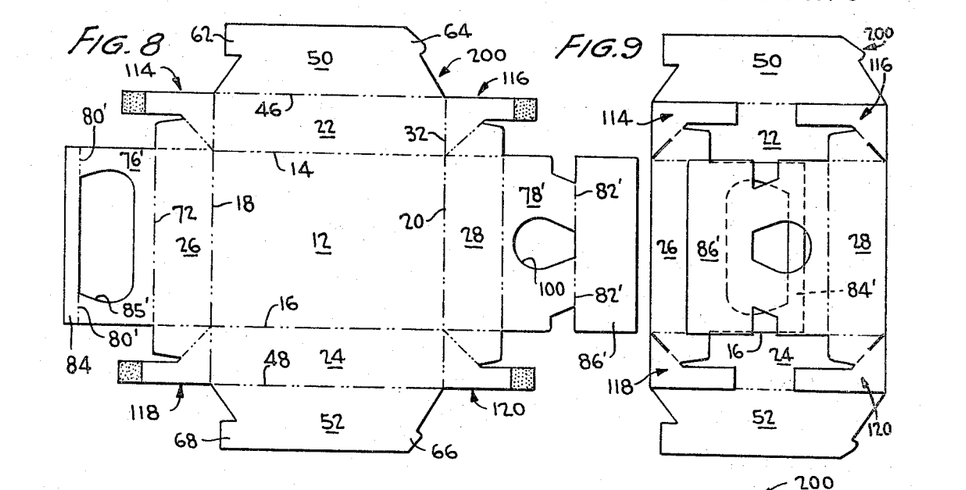
FIG. 8 is a plan view of still another blank from which another embodiment of the tray of the invention may be produced.
FIG. 9 is a plan view, similar to FIG. 4, showing the blank of FIG. 8 in its pre-assembled condition prior to erection.
Figures 10, 11:
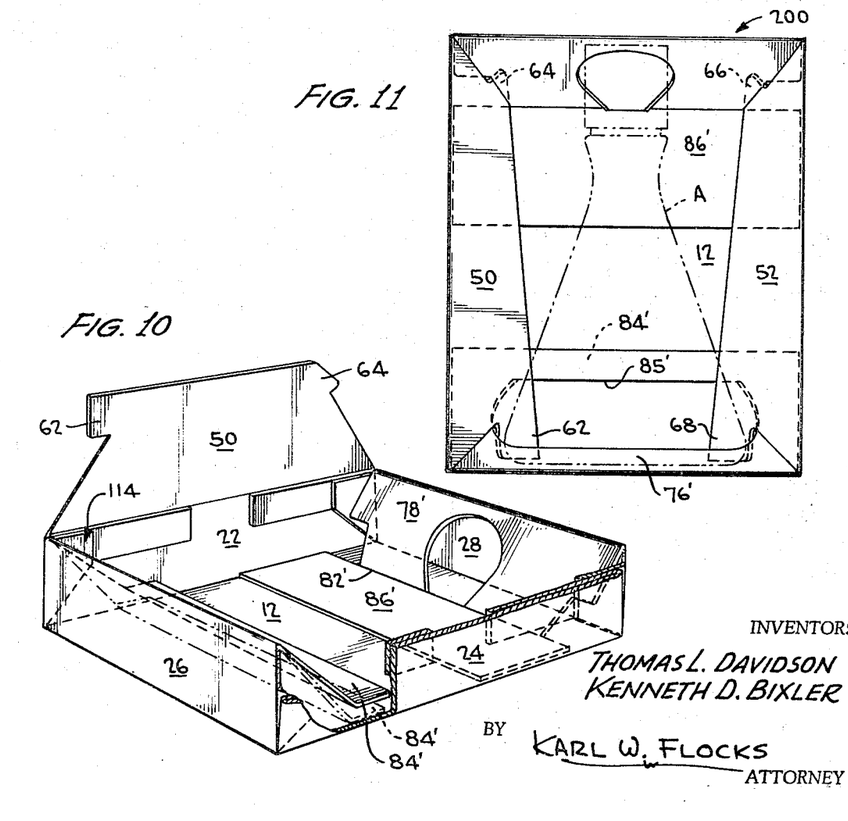
FIG. 10 is a fragmentary perspective view, similar to FIG. 5 showing the pre-assembled blank of FIG. 9 in a partially erected condition.
FIG. 11 is a top plan view of the erected tray produced from the blank of FIG. 8 as pre-assembled in FIG. 9.

Referring to FIGS. 8–10, and first considering FIG. 8, another blank 200 is disclosed for producing a still further embodiment of the tray of the invention. Reference numerals used on FIG. 1 have been applied to the blank of this embodiment to that structure which is similar to that of the previously described embodiment. In substantially all respects, the blank of FIG. 8 is pre-assembled and erected in the same manner as the previously described embodiments. However, the inner wall panels 76' and 78' do not include a transverse intermediate fold line, as in the previously described embodiments, and hingedly connected to colinear, segmental score or fold lines 80' and 82' are anchor flaps 84' and 86', respectively.

The blank of FIG. 8 is pre-assembled in the manner shown in FIG. 9 by inwardly folding along colinear fold lines 18, 20, 34 the respective coplanar disposed panels 26, 76' and bellows-fold assemblies 114 and 118, and thereafter coplanar panels 28, 78' together with anchor flap 86' and bellows-fold assemblies 116 and 120 are folded into overlying relationship with respect to panels 26, 76' and anchor flap 84'.

Erection of the pre-assembled blank of FIG. 9 is accomplished by inwardly folding panels 22 and 24 along fold lines 14 and 16 resulting in vertical orientation of the outer walls 26 and 28 as seen in FIG. 10. Lock-up of the tray is accomplished as described in detail with respect to FIGS. 5 and 6 of the previously described embodiment. It will be noted that the anchor flaps 84' and 86' will not be adhesively secured to the upper surface of the bottom panel 12.

When the lock lugs 62 and 68 of the inner wall panels 50 and 52, respectively, are received within the aperture 85' of the angularly disposed inner wall panel 76', anchor flap 84' will actually be resiliently suspended above the inner surface of the bottom wall 12 of the tray due to the resilient character of the material at the folds of the bellows-fold assemblies 114 and 118. When the article A (see FIG. 11) has the bottom portion thereof inserted in the aperture 85', this end of the article will be substantially resiliently or displaceably suspended in a sling formed by the anchor flap 84' and thus will be protected during shipping and handling in the packaging-and-display tray.

The last disclosed embodiment provides inner package or tray walls and in a sense "float" or resiliently support the article due to the natural resilience of the folded paperboard and will accommodate a range of sizes of articles and shapes.

Figure 12:
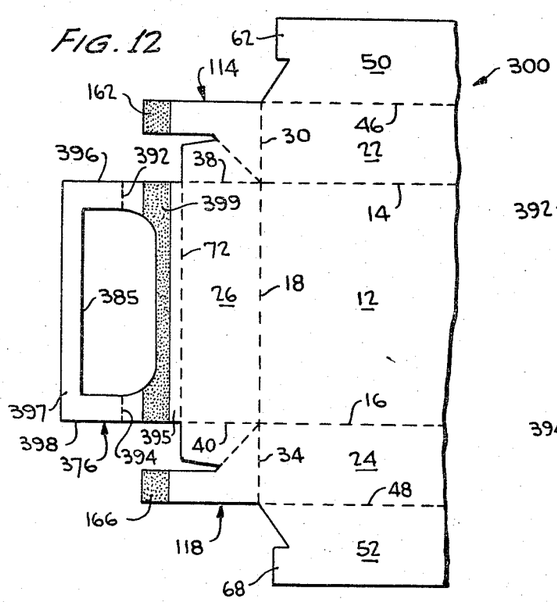
FIG. 12 is a fragmentary plan view of a blank for producing another form of the invention.

Referring to FIGS. 12–15, the blank for producing a still further embodiment of the invention is indicated generally at 300. Assembly and erection of the blank of FIG. 12 is substantially the same as that described in detail with respect to previously described embodiments. However, the outer wall panel 26 has hingedly connected to the marginal fold line 72 a modified inner wall panel indicated generally at 376. The inner wall panel 376 includes side margins 396 and 398 colinear with margins 14, 38 and 16, 40 of the bottom wall and outer wall panels 12 and 26, respectively, and has formed intermediately therethrough a suitably conformed aperture 385 conforming to a portion of an article to be displayed and packaged in the erected tray. The inner wall panel 376 has extending longitudinally thereof and substantially bisecting the width of this panel colinear, segmental fold or score lines 392 and 394 defining substantially equal width panel segments 395 and 397. The bellows-fold assemblies 114 and 118; comparable to those of the previously described embodiments, will have adhesive receiving portions 162 and 166 (as previously described with respect to the other embodiments) and when applying adhesive to these portions, an elongated intermediate strip of adhesive will be received on the adhesive-receiving portion 399 extending intermediately and lengthwise of the panel segment 395.

Figure 13:
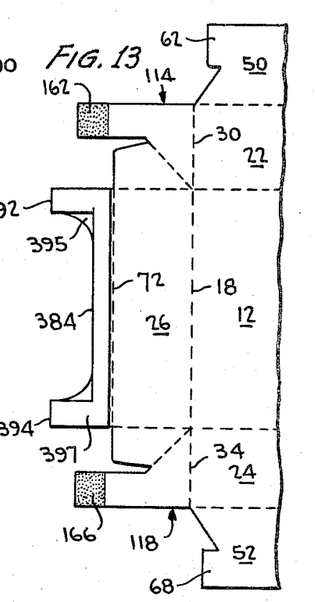
FIG. 13 is a fragmentary plan view showing the blank of FIG. 12 in a partially assembled condition.

Considering FIG. 13, when the blank of FIG. 12 is pre-assembled, the inner wall panel segment 377 is folded at colinear-segmental score or fold lines 392 and 394 so that the panel segment 397 adheres to the glue-receiving portion 399 and overlies and is secured to the panel segment 395.

Thereafter, the glue receiving portions 162 and 166 of the bellows-fold assemblies 114 and 118 are secured to the outer wall panels 22 and 24 (as described with respect to the previously disclosed embodiments), i.e. the outer wall panel 26 is folded together with the bellows-fold assemblies 114 and 118 along the fold lines 18, 30 and 34 into overlying relationship with respect to the bottom panel 12, and outer wall panels 22 and 24, respectively.

Figures 14, 15:
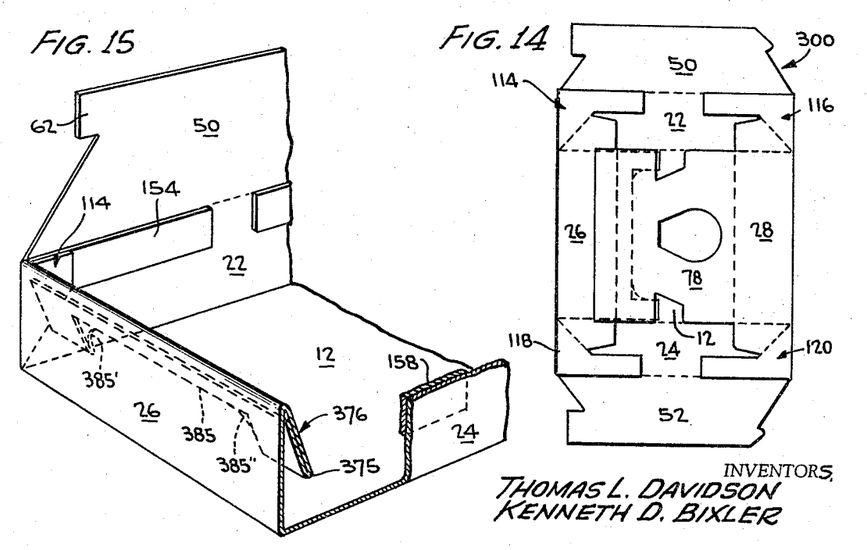
FIG. 14 is a plan view, on a reduced scale, showing the blank of FIG. 12 assembled.
FIG. 15 is a fragmentary perspective view, with portions broken away, showing the blank of FIG. 14 partially erected.

Without describing the complete assembling of the blank 300, it is sufficiently clear that the blank 300 of FIG. 12 will be pre-assembled in the manner seen in FIG. 14 and conforms in appearance to the pre-assembled blank disclosed in FIG. 4, for example.

In order to erect the pre-assembled blank of FIG. 14, the outer wall panels 22 and 24 are folded inwardly toward each other, and when these outer wall panels are at right angles to the bottom wall panel 12, the opposed other pair of outer wall panels 26 and 28 will automatically be oriented into right angular relationship to the bottom wall 12 as clearly seen in FIG. 15. Subsequently, the inner wall panels 50 and 52 will be folded down into angularly converging relationship relative to each other and toward the inner surface of the bottom wall panel 12.

It will be noted that the lower margin 375 of the inner wall panel 376 (see FIG. 15) will be disposed in vertically spaced relation above the inner surface of the bottom wall panel 12 and will be maintained in this angular position, i.e. overlying the article disposed in the tray, by the bellows-fold assemblies 114 and 118. Further, the lock tabs 62 and 68 of the inner wall panels 50 and 52 respectively will lockingly engage beneath the corners 385' and 385", respectively, of the cutout portions 385, i.e. these lock tabs function in the identical manner as the previously described embodiments.

Figures 16, 18:
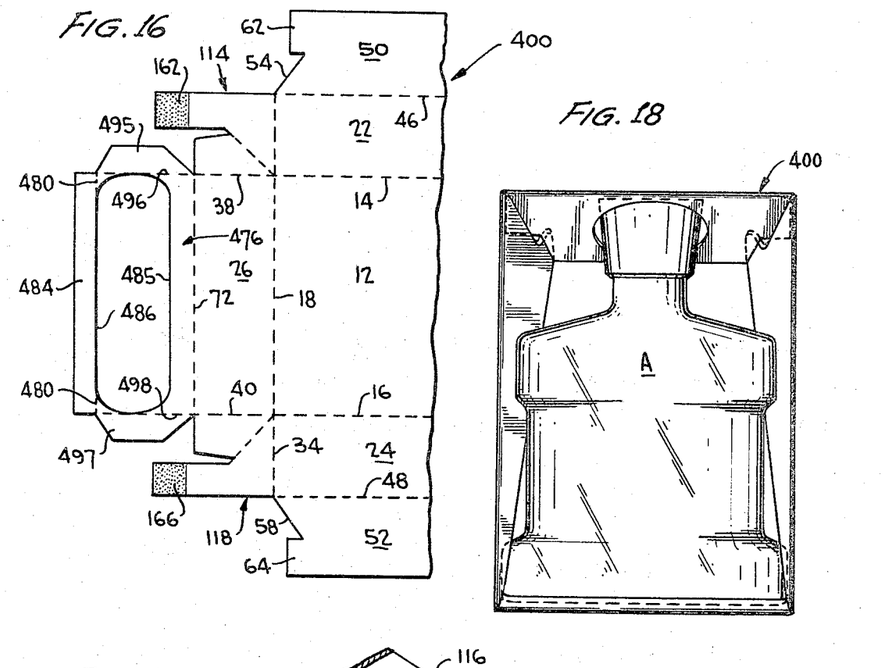
FIG. 16 is a fragmentary plan view of still another embodiment of the invention.
FIG. 18 is a plan view of the display tray erected from the blank of FIG. 16 and showing a product disposed therein.
Figure 17:
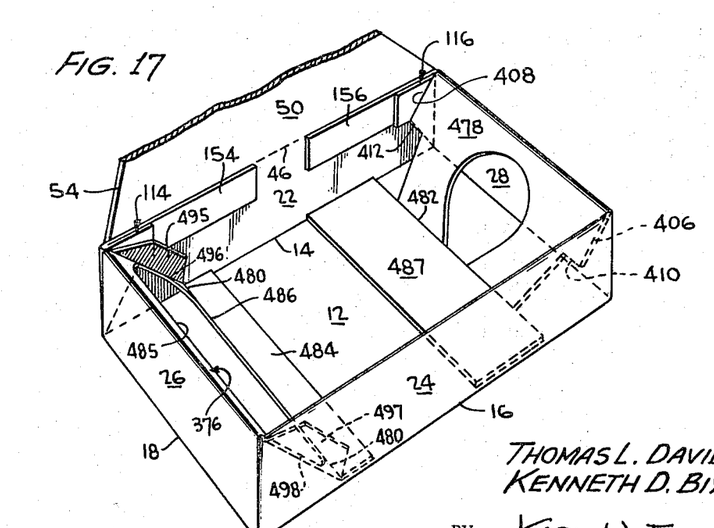
FIG. 17 is a fragmentary perspective view, with portions broken away, and showing the blank of FIG. 16 in a partially erected condition.

Referring to FIGS. 16–18, a still further embodiment of the invention is disclosed, and a fragmentary portion of the blank of FIG. 16 is indicated generally at 400. The portions of the blank 400 which are similar in structure and function to portions previously described with respect to the other disclosed embodiments, will be identified with reference numerals used on the previously described embodiments without going into a detailed description of the structure and funcion thereof.

This embodiment of the invention includes a modified inner wall panel indicated generally at 476. The modified inner wall panel 476 includes a cutout portion 485 conforming to a portion of the article A (see FIG. 18), and is hingedly connected to the outer wall panel 26 on a score or hinge line 72. The inner wall panel 476 includes side marginal fold or score lines 496 and 498 respectively disposed in colinear relationship with respect to the marginal fold lines 14, 38 and 16, 40. Foldably connected to the side marginal fold lines 496 and 498 are stabilizing flaps 495 and 497. Extending in colinear alignment with the margin 486 of the cutout portion 485 are segmental fold lines 480 terminating at the side marginal fold lines 496 and 498. Hingedly connected to the segmental fold lines 480 is a foot or anchor flap 484; the function of which will subsequently be described in detail.

The blank of FIG. 16 is erected by adhesively securing portions 162–168 (glue receiving portions 164 and 168 not being shown) to the inner surfaces of the outer wall portions 22 and 24 as in the previously described embodiments. Further, as seen in FIG. 18, as compared with FIG. 6, for example, the tray is erected and supports the article A in the manner described in detail with respect to FIG. 6, for example.

Considering FIG. 17, the inner wall panel 478 has foldably connected thereto at fold line 482 a foot or anchor flap 487 which is not adhesively secured to the inner surface of the bottom wall panel 12. In this regard, the flap 484 which is hingedly connected to the segmental, colinear fold lines 480 likewise is not adhesively secured to the inner surface of the bottom wall panel 12 but merely rests thereon. When the tray is being erected (see FIG. 17), the flaps 495 and 497 will be folded normal to the general plane of the inner wall panel 476 and will overlie and substantially engage the bellows-fold assemblies 114 and 118 which automatically position the outer wall panels 26 and 28 as in the previously described embodiments. When the inner wall panels 50 and 52 are folded inwardly for the purpose of locking them with respect to the notches 410, 412 and the aperture 485, the angular margins 54 and 58 will respectively engage at the fold lines 496 and 498 of the flaps 495 and 497. In this manner, the erected tray is substantially stabilized and maintained in its erected condition.

Although the inner wall panel 478 is illustrated as having free margins 406 and 408, stabilizing flaps such as those illustrated at 495 and 497 could be incorporated at the disclosed free marginal portions 406 and 408.

In all of the embodiments, the bellows-fold assemblies or web corners provide exceptional stacking strength to the packaging-and-display trays as well as providing a finished look at the four corners. The inwardly angled inner wall panels provide a copy and display area as well as directing the consumer's eye to the article displayed and packaged. The trays of the invention lend themselves to being erected manually or on automatic apparatus.

It will be obvious to those skilled in the art that various changes may be made without departing from the scope of the invention and therefore the invention is not limited to what is shown in the drawing and described in the specification but only as indicated in the appended claims.

What is claimed is:

1. A blank for producing a display and packaging tray having self-orienting side walls, comprising, a one-piece planar blank of a paper-product material, said blank having cut-and-score portions for defining an erected rectangular tray with inwardly converging walls having cooperating lock means, said blank including a rectangular bottom panel defined by intersecting pairs of mutually parallel fold lines, pairs of opposed, rectangular outer wall panels hingedly connected to said parallel fold lines, bellows panels hingedly connected to adjacent ends of said outer wall panels and including a bisecting fold line extending angularly from the corners of said bottom panels;

said bellows panels including glue flaps extending from opposite ends of one pair of said outer wall panels at outer terminal ends of said bisecting fold lines and flanking in spaced relation opposite ends of said other pair of outer wall panels;

said one pair of said outer wall panels including a first pair of inner wall panels foldably connected to outer margins thereof;

said inner wall panels including converging side margins at opposite ends thereof and terminating in laterally projecting lock tabs;

said other pair of outer wall panels including a second pair of inner wall panels foldably connected to the outer margins thereof, said second pair of inner wall panels including lock portions abuttingly engageable with said lock tabs for retaining the tray in an erected condition.

2. The blank as claimed in claim 1 in which at least one of said second pair of inner wall panels includes a terminal foot flap hingedly connected thereto.

3. A blank as claimed in claim 1 in which said foot flap comprises a glue flap panel for adhering to the inner surface of said bottom panel when said tray is erected.

4. A blank as claimed in claim 1 in which said second pair of inner wall panels include an intermediate transverse fold line defining a pair of panel segments between said outer wall panels and said anchor flap.

5. A blank as claimed in claim 1 in which said first pair of inner wall panels each include terminal abutment panels having a free transverse abutment edge margin for abutting engagement when said abutment panels are juxtaposed on the inner surface of said bottom panel when said tray is erected.

6. A blank as claimed in claim 1 in which at least one of said second pair of inner wall panels includes at opposite side margins thereof flap elements hingedly connected thereto, said one inner wall panel including the terminal foot flap hingedly connected thereto.

7. A blank as claimed in claim 1 wherein each of said second pair of inner wall panels include terminal anchor flaps hingedly connected thereto.

8. A blank as claimed in claim 1 in which at least one of said second pair of inner wall panels includes an intermediate fold line forming two substantially equal width panel segments thereon, a glue receiving portion intermediately disposed on one of said panel segments for adhering to said other panel segment when said blank is assembled, the width of said panel segments being less than the width of the outer wall panel to which said one inner wall panel is hingedly connected whereby when the tray is erected said intermediate fold lines will be disposed above the inner surface of said inner wall panel.

9. A display-and-packaging tray having self-orienting side walls, comprising in combination, a rectangular bottom panel, pairs of outer wall panels foldably connected to and extending vertically from opposite side edges of said bottom panel, bellows panels foldably connected to adjacent ends of said outer wall panels and including substantially triangular panel segments having a portion integrally secured to and folded in overlying relation on the inner surface of one pair of said pair of outer wall panels and orienting said other pair of outer wall panels in vertically extending, mutually parallel relation, pairs of inner wall panels foldably connected to opposed upper margins of said pair of outer wall panels, said inner wall panels converging angularly inwardly from the upper edges of said outer wall panels, said inner wall panels including cooperating lock-means maintaining and orienting said inner wall panels in the aforementioned converging angular relationship, at least one of said pairs of inner wall panels including a transverse anchor flap juxtaposed on the inner of said bottom panel in spaced relation from the inner surface of the base of the outer wall panel from which said inner wall panel converges.

10. A display and packaging tray as claimed in claim 9 in which at least one of said inner wall panels includes side marginal flap elements overlying said bellows panels and adjacent thereto and disposed beneath said other pair of inner wall panels.

11. A display and packaging tray as claimed in claim 9 in which at least one of said inner wall panels comprises a pair of substantially equal width panel segments secured in overlying relationship, said panel segments including a lower marginal edge vertically spaced above the inner surface of the bottom panel of said tray.

12. The structure as claimed in claim 9 in which said one of said pairs of inner wall panels includes an intermediate transverse fold line defining a pair of articulated panel segments therein.

13. The structure as claimed in claim 9 in which said anchor flaps are adhesively secured on the inner surface of said bottom panel.

14. The structure as claimed in claim 13 in which said anchor flap extends inwardly from the lower edge of said inner wall panels and is disposed therebeneath.

15. The structure as claimed in claim 9 in which said anchor flaps extend from the lower margin of said inner wall panels toward each other, the other pair of inner wall panels including free edge margin overlying and engaging transversely over the upper surfaces of said anchor flaps.

16. The structure as claimed in claim 15 in which one of the upper wall panel anchor flaps is disposed above the inner surface of said bottom plane and is displaceably suspended thereabove.

17. The structure as claimed in claim 9 in which said other pair of inner wall panels include abutment panels articulated to the lower marginal edges thereof and extend toward each other in juxtaposed relation on the inner surface of said bottom panel, said abutment panels including free opposed edge portions disposed in confronting and abutting relation.

18. The structure as claimed in claim 9 in which one said pair of inner wall panels includes angular free edges overlying the inwardly converging outer surface of the other pair of inward converging inner wall panels.

19. The structure of claim 18 in which one of said other pair of inner wall panels includes an aperture portion, the one pair of inner panels including tabs loosely received in said aperture portion.

References Cited

UNITED STATES PATENTS 2,714,483   8/1955   Randles ___________ 229—34

FOREIGN PATENTS 453,180   9/1936   Great Britain.

JOSEPH R. LECLAIR, *Primary Examiner.*

R. PESHOCK, *Assistant Examiner.*